July 28, 1959 T. A. BUCHHOLD 2,897,296

MAGNETIC AMPLIFIER

Filed Nov. 23, 1956 2 Sheets-Sheet 1

INVENTOR
THEODOR A. BUCHHOLD
BY Victor D. Borst
ATTORNEY

INVENTOR
THEODOR A. BUCHHOLD
BY Victor D. Borst
ATTORNEY 2,897,296

MAGNETIC AMPLIFIER

Theodor A. Buchhold, Schenectady, N.Y., assignor to Sperry Rand Corporation, Ford Instrument Company Division, Long Island City, N.Y., a corporation of Delaware Application November 23, 1956, Serial No. 623,963

5 Claims. (Cl. 179—171)

Figure 1:
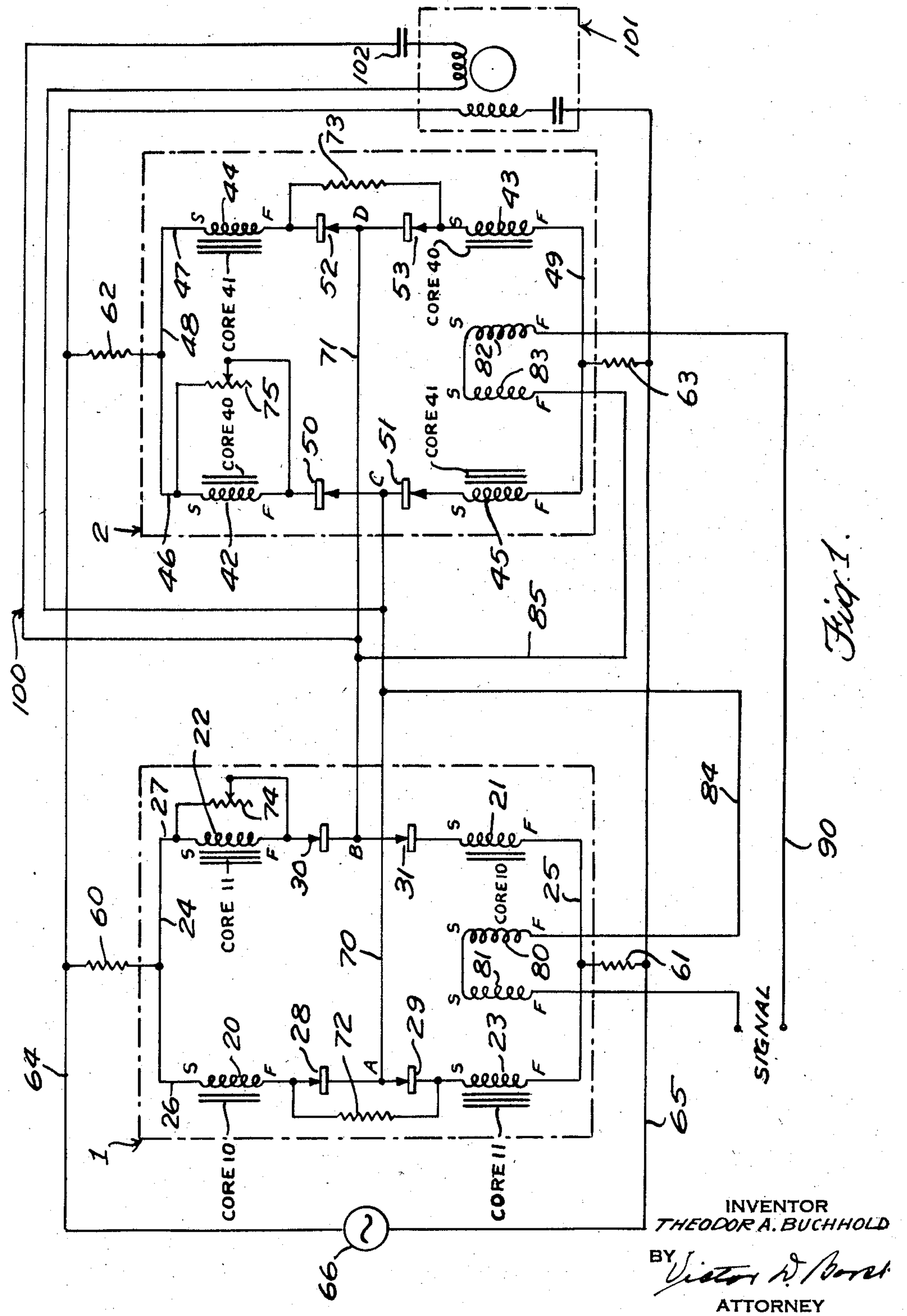

This invention relates to magnetic amplifier control systems and more particularly to a single stage full wave reversible output magnetic amplifier having means to increase the gain and improve the linearity in the output response relative to input signals.

A single stage of a conventional half-wave bridge type magnetic amplifier is characterized by a bridge network comprising two reactors connected in parallel across the line in series with similarly poled half-wave rectifiers so that they are pulsed by the same half-wave of the line voltage. Each reactor has split windings and one part of each winding is connected in series with a part of the other winding. The control current which governs the saturation of the reactor magnetic circuits of the first stage acts differentially or in a push-pull relation with respect to the reactor windings to effect a differential flux preconditioning of the two magnetic paths on the off half-cycle of the reactor windings. The half-wave output of the single stage appears across the two branch circuits at points between the two rectifiers.

In general, this invention contemplates a new and novel, bridge type, full-wave single stage amplifier comprising four reactors connected across the line in series with rectifiers poled so that two reactors are pulsed by each of the line voltage half-cycles. Each reactor has split windings and one part of each winding is connected in series with a part of the other winding in circuits which are similarly poled. The control current which governs the saturation of all the reactor magnetic circuits acts differentially or in push-pull relation with respect to the reactor windings to effect a differential flux preconditioning of the two magnetic paths on the off half-cycle of the reactor windings. The two oppositely poled branch circuits are interconnected at points between the rectifiers and the full-wave reversible output of the stage appears across the interconnecting pair of conductors. Normally, a circulating current flows in each interconnecting conductor during a portion of each cycle when the saturation of a pair of magnetic circuits is not simultaneous or when biasing resistors are conventionally employed as rectifier shunts. These circulating currents impair the gain and linearity of the output response, especially for weak control signals. Also, a negative feedback voltage is normally induced into the control circuit by transformer action from the currents flowing in the unsaturated reactor windings which adversely affects the control current wave shape and the gain factor of the amplifier.

The invention contemplates circuit means for introducing into the control circuit a compensating voltage from the output circuit in order to improve the amplifier gain. Also, circuit means are provided to suppress the circulating currents in the interconnecting conductors in order to improve the linearity of the output to varying input control signals. Further a new and novel means is provided for biasing the magnetic circuits.

Figure 2:
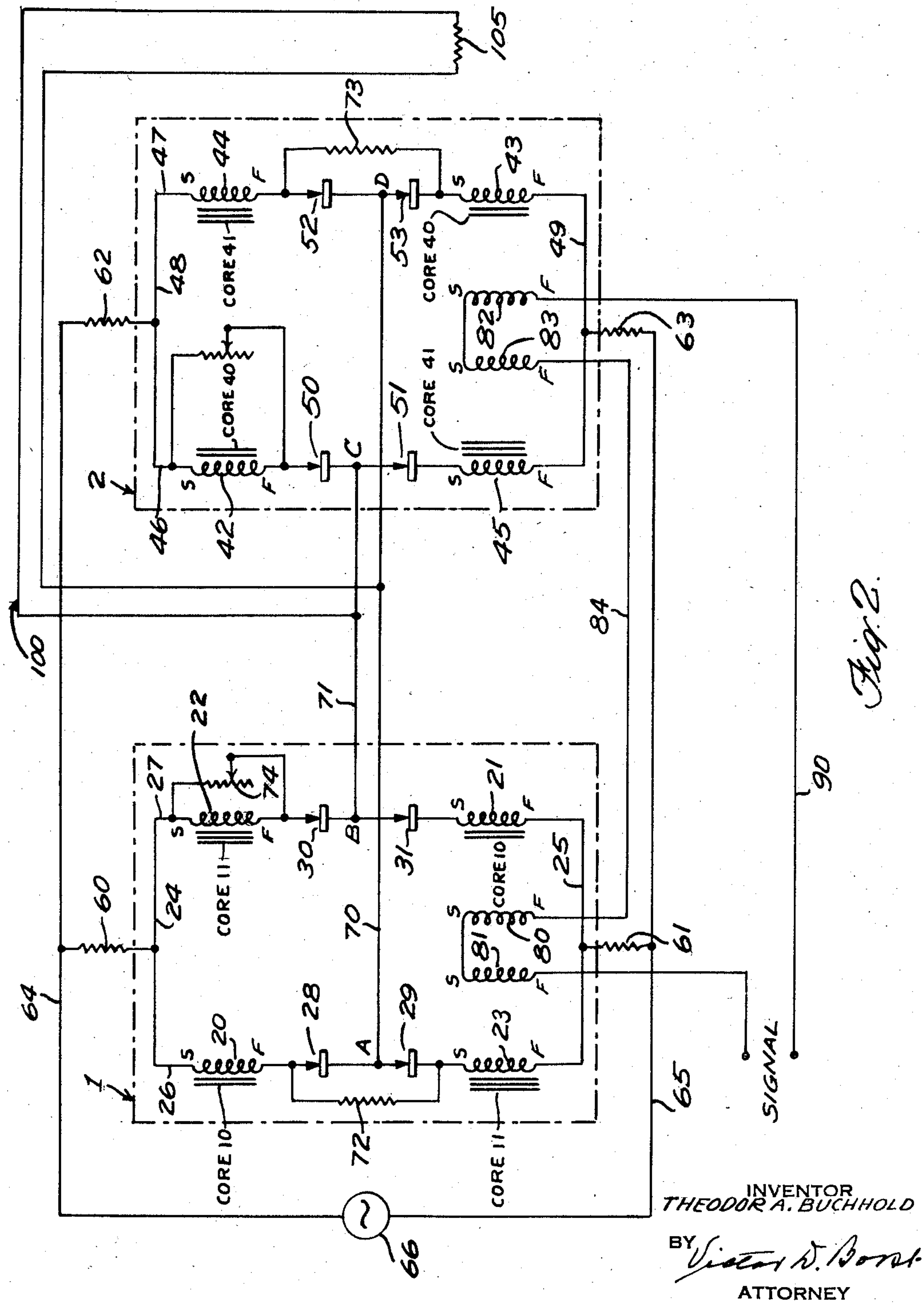

The features of the invention will be understood more clearly from the following detailed description taken in conjunction with the accompanying drawings in which:

Fig. 1 is a schematic diagram of a full-wave bridge type magnetic amplifier connected to an A.C. load; and Fig. 2 is a modification of Fig. 1 to produce a pulsating D.C. current in the output circuit.

Referring to Fig. 1, there is provided two saturable reactor bridge networks 1 and 2 for the disclosed single stage full-wave magnetic amplifier. Bridge network 1 includes two closed saturable magnetic ring cores 10 and 11 on which respectively are disposed reactor windings 20 and 21 and reactor windings 22 and 23, respectively. Connected across conductors 24 and 25 are two branch circuits 26 and 27. Branch circuit 26 includes an impendance dividing series combination comprising the winding 20, two half-wave rectifiers 28 and 29, both rectifiers being poled away from the conductor 24, and the winding 23. Branch circuit 27 includes an impedance dividing series combination comprising the winding 22, two half-wave rectifiers 30 and 31, both rectifiers being poled away from the conductor 24, and the winding 21. Bridge network 2 includes two closed saturable magnetic ring cores 40 and 41 on which are disposed reactor windings 42 and 43 and reactor windings 44 and 45, respectively. Two branch circuits 46 and 47 are connected across conductors 48 and 49. Branch circuit 46 includes an impedance dividing series combination comprising the winding 42, two half-wave rectifiers 50 and 51, both rectifiers being poled toward the conductor 48, and the winding 45. Branch circuit 47 includes an impedance dividing series combination comprising the winding 44, two half-wave rectifiers 52 and 53, both rectifiers being poled toward the conductor 48, and the winding 43. The conductors 24 and 25 of bridge network 1 and the conductors 48 and 49 of bridge network 2 are connected by four resistors of equal ohmic values 60, 61, 62 and 63, across A.C. lines 64 and 65, the latter receiving energization from an A.C. generator 66. Resistors 60 and 62 connect conductors 24 and 48 respectively to line 64 and resistors 61 and 63 connect conductors 25 and 49 respectively to the line 65. All reactor windings are wound in the same direction and sense and the start and finish of all windings are designated in the schematic diagram by S and F respectively. The points between the rectifiers in branches 26, 27, 46 and 47 are designated A, B, C and D, respectively, and the output of the single stage amplifier appears across a pair of conductors 70 and 71 which interconnects the branches of one pair of branch circuits with the branches of the other pair of branch circuits. For an A.C. voltage output from the amplifier, the conductor 70 connects point A with point C and the conductor 71 connects point B with point D when the reactor windings are poled as shown. Disposed on the magnetic circuits 10 and 11 are oppositely acting control windings 80 and 81 and disposed on the magnetic cores 40 and 41 are oppositely acting control windings 82 and 83, respectively. An input signal circuit 90 comprises in series the windings 81 and 80, a conductor 84 from winding 80 to the conductor 70, a conductor 85 from conductor 71 to the winding 83, and the windings 83 and 82. An output circuit 100 connected across the conductors 70 and 71 includes an A.C. load 101 shown as a two phase servo motor in series with a capacitor 102. The capacitor 102 of selected value increases the voltage applied to a servomotor control winding, increases the power factor of the magnetic amplifier and improves the circuit stability.

The half-wave rectifiers disposed in each pair of branch circuits are poled in the same direction so that both reactor windings utilize the same half-cycle of the alternating supply voltage. For the other pair of branch circuits, the rectifiers are poled in opposite directions to utilize the other half-cycle of the alternating supply voltage. Resistors 72 and 73 of selected values in shunt across both rectifiers in branch circuits 26 and 47, respectively, are used to control the back current on the off half-cycle with zero input signal and so serve as biasing means to bring the operating point on the hysteresis curve to the desired quiescent level. As stated above, the control windings on each pair of magnetic circuits are connected in a series opposition circuit and have push-pull flux relationship to the four reactor windings on the pairs of magnetic circuits. A control signal current during the off half-cycle of supply alternating voltage preconditions the state of magnetism in the two associated reactor cores relative to the quiescent level.

To adjust for zero current in output circuit 100 with zero current in control circuit 90, resistors 74 and 75 are provided in shunt relationship to windings 22 and 42, in branches 27 and 46, respectively.

As a consequence of currents flowing in the unsaturated reactor windings, undesirable voltages will be induced in the control windings by transformer action and undesirable currents will normally flow in the control circuit to adversely affect the control current waveshape and the magnetic amplifier amplification gain. To deemphasize the feedback voltage, a compensating voltage of the correct phase from conductors 70 and 71 is connected into the series control circuit 90. By varying the ratio of anode winding turns to the control winding turns, the optimum control current waveshape and amplification characteristics can be achieved for the amplifier. As an expedient, a coupling transformer may be used between the connections to the control circuit 90 and the connections to conductors 70 and 71. No circulating currents will flow in the conductors 70 and 71 if point A is always at the same potential as point C and if point B is always at the same potential as point D. Since this condition is normally out of exact balance over some portion of the overall cycle, resistors 60, 61, 62 and 63 preferably having equal ohmic value deemphasize the magnitude of the circulating currents and the linearity of the amplifier output response is thereby improved.

The means for biasing the magnetic circuits by providing one resistor in shunt with two half-wave rectifiers prevents a parasitic circulating current from flowing in the associated bridge network as induced therein by the oppositely wound control windings. Such a parasitic circulating current flows when each half-wave rectifier is shunted by a separate resistor in the normal manner. Referring to the schematic diagram, in network 1 there is a closed current path in the circuit; conductor 70, output circuit 100, conductor 71, half-wave rectifier 31, winding 21, conductor 25, winding 23, resistor 72 and half-wave rectifier 28. In the off half-cycle, the induced voltages in the windings 21 and 23 due to the control signal current in windings 80 and 81 add together in this circuit and a parasitic current would flow if each half-wave rectifier is shunted by a separate bias resistor. For the bias circuit means disclosed, the voltage drop across half-wave rectifier 28 in the direction from the conductor 25 to the conductor 24 during the off half-cycle is greater than and opposes the voltages induced in windings 21 and 23 and therefore no parasitic circulating current can flow.

Fig. 2 discloses a modification of the amplifier schematically represented in Fig. 1 wherein the output voltage is pulsating D.C. Like reference numbers will be used to identify corresponding elements in both figures. In Fig. 2, conductor 70 interconnects point A in branch circuit 26 with point D in branch circuit 47 and conductor 71 connects point B in branch circuit 27 with point C in branch circuit 46. The output pulsating D.C. current in the output circuit 100 connected to conductors 70 and 71 is terminated in a resistor load 105. The D.C. output is accounted for by the fact that the conductors 70 and 71 connect non-corresponding branches in the two half wave amplifiers. Branches which are controlled in the same sense by the signal circuit may be designated corresponding branches while branches controlled by the signal circuit in the opposite sense are designated non-corresponding branches. Because the line currents pass through the half wave amplifiers in the opposite direction, the output points in the non-corresponding branches are at substantially the same potential level on each half wave cycle of line voltage. In the arrangement shown in Fig. 1 and described above, corresponding branches of the two half wave amplifiers are joined to the output and due to the opposite polarity of the currents in these branches each conductor is connected alternately to high and low voltage points on succeeding half cycles. It will be noted that the feedback circuit of Fig. 1 connecting the voltage across conductors 70 and 71 into the control circuit can be omitted so that alternate cycles of pulsating D.C. current in the output circuit 100 will have equal magnitude.

It is to be understood that various modifications of the invention other than those described may be effected by persons skilled in the art without departing from the principle and scope of the invention or defined in the appended claims.

What is claimed is:

1. A single stage full wave magnetic amplifier comprising two pairs of closed magnetic circuits, an alternating current line, two pairs of impedance dividers, each impedance divider of one pair of impedance dividers having a reactor winding arranged on each magnetic circuit of one pair of magnetic circuits, each impedance divider of the other pair of impedance dividers having a reactor winding arranged on each magnetic circuit of the other pair of magnetic circuits, a resistor device connected between one side of the line and one side of each pair of impedance dividers, a second resistor device connected between the other side of the line and the other side of each pair of impedance dividers, two unidirectional conducting devices inserted between the reactor windings in each impedance divider, said devices being poled in the same direction in each pair of impedance dividers, the devices in one pair of impedance dividers being oppositely poled to the devices in the other pair of impedance dividers, two resistors, each resistor shunting the two unidirectional devices in one impedance divider of the pair of impedance dividers, a conductor connecting each of the impedance dividers of one pair of impedance dividers with one impedance divider of the other pair of impedance dividers, said conductive means being connected at the junction point of the two devices in each impedance divider and a series control circuit including four control windings, an output circuit connected to said conductors being therefore in bridge connection across each of said pairs of impedance dividers, one control winding disposed on each magnetic circuit and the four control windings being arranged in push-pull flux relationship with respect to each pair of magnetic circuits, said series control circuit being connected to said conductors whereby induced voltages in the control circuit are subject to the control of the output voltages.

2. A single stage full wave magnetic amplifier as claimed in claim 1 wherein said resistor devices are resistors with equal ohmic value.

3. A single stage full wave magnetic amplifier as claimed in claim 1 wherein there is disposed an inductive load in said output circuit and a capacitor is provided in said output circuit between said inductive load and the connection of said output circuit to one of said conductors whereby the voltage applied to said inductive load and the power factor of the magnetic amplifier is increased and the stability of said circuit is improved.

4. A single stage full wave magnetic amplifier as claimed in claim 1 wherein the conductors connect correspondingly controlled impedance dividers whereby the magnetic amplifier is adapted to yield an alternating current output.

5. A single stage full wave magnetic amplifier as claimed in claim 1 wherein the conductors connect non-correspondingly controlled impedance dividers whereby the magnetic amplifier is adapted to yield a direct current output.

References Cited in the file of this patent

UNITED STATES PATENTS

| | | |
|---|---|---|
| 2,754,474 | Barnhart | July 10, 1956 |

| | | |
|---|---|---|
| 2,764,719 | Woodson | Sept. 25, 1956 |
| 2,764,726 | Sanders | Sept. 25, 1956 |

OTHER REFERENCES

Maine: "High Speed Magnetic Amplifiers," Electronics Engineering, May 1954, pages 180–185.

Geyger text: "Magnetic Amplifier Circuits," Jan. 29, 1954, pages 174, 207–209.